United States Patent
Chevallier et al.

(10) Patent No.: US 7,155,589 B2
(45) Date of Patent: Dec. 26, 2006

(54) PERMANENT MEMORY BLOCK PROTECTION IN A FLASH MEMORY DEVICE

(75) Inventors: Christophe Chevallier, Palo Alto, CA (US); See Kit Leong, Los Gatos, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 11/199,321

(22) Filed: Aug. 8, 2005

(65) Prior Publication Data

US 2005/0273550 A1    Dec. 8, 2005

Related U.S. Application Data

(63) Continuation of application No. 10/279,470, filed on Oct. 24, 2002, now Pat. No. 6,948,041.

(51) Int. Cl.
  *G06F 12/00* (2006.01)
(52) U.S. Cl. .................. 711/163; 711/103; 711/154; 711/156; 235/382; 365/195
(58) Field of Classification Search ............... 711/163, 711/103, 154, 156; 235/382; 365/195
  See application file for complete search history.

(56) References Cited

U.S. PATENT DOCUMENTS

| 5,592,641 | A | 1/1997 | Fandrich et al. |
| 5,749,088 | A | 5/1998 | Brown et al. |
| 5,845,332 | A | 12/1998 | Inoue et al. |
| 5,930,826 | A | 7/1999 | Lee et al. |
| 5,991,197 | A * | 11/1999 | Ogura et al. ............ 365/185.11 |
| 6,026,016 | A | 2/2000 | Gafken |
| 6,154,819 | A | 11/2000 | Larsen et al. |
| 6,209,069 | B1 * | 3/2001 | Baltar ........................ 711/163 |
| 6,363,463 | B1 | 3/2002 | Mattison |
| 6,446,179 | B1 * | 9/2002 | Baltar ........................ 711/163 |
| 2003/0041248 | A1 * | 2/2003 | Weber et al. ............... 713/182 |

OTHER PUBLICATIONS

Intel, Datasheet 28F128J3A, pp. 18, 27-29.
Intel Datasheet, "3 Volt Intel StrataFlash Memory-28F128J3A, 28F640J3A, 28F320J3A(x8/x16)", pp. i-52, Intel, Apr. 2001.

* cited by examiner

*Primary Examiner*—Stephen C. Elmore
(74) *Attorney, Agent, or Firm*—Leffert Jay & Polglaze, P.A.

(57) ABSTRACT

A secure command is entered into a Flash memory device. A control data word is written to the memory device to specify which blocks of memory are to be permanently secured against write and erase operations. The bits of the control data word specify different blocks of memory to be permanently secured.

19 Claims, 4 Drawing Sheets

|   | FIRST BUS CYCLE |   |   | SECOND BUS CYCLE |   |
|---|---|---|---|---|---|
| OPER | ADDR | DATA | OPER | ADDR | DATA |
| WRITE | X | C0H | WRITE | 008CH | aa |

*Fig. 1*

| ADDR | DQ[7:5] | DQ[4] | DQ[3] | DQ[2] | DQ[1] | DQ[0] |
|---|---|---|---|---|---|---|
| 008CH | NOT USED | SECURES ALL 32 BLOCKS | SECURES BLOCK 31 ONLY 1F0000H | SECURES BLK 30 ONLY 1E0000H | SECURES BLOCK 1 ONLY 010000H | SECURES BLOCK 0 ONLY 000000H |

*Fig. 2*

| BLOCK LOCKED | BLOCK SECURED | BLOCK STATUS |
|---|---|---|
| NO | NO | NOT LOCKED |
| NO | YES | LOCKED |
| YES | NO | LOCKED |
| YES | YES | LOCKED |

*Fig. 3*

PERMANENT MEMORY BLOCK PROTECTION IN A FLASH MEMORY DEVICE

RELATED APPLICATION

This application is a Continuation of U.S. application Ser. No. 10/279,470, filed Oct. 24, 2002, titled "PERMANENT MEMORY BLOCK PROTECTION IN A FLASH MEMORY DEVICE," U.S. Pat. No. 6,948,041, which is commonly assigned and incorporated herein by reference.

BACKGROUND OF THE INVENTION

1. Field of the Invention

The present invention relates generally to Flash memory and more particularly to memory block protection.

2. Description of the Related Art

Flash memory devices have developed into a popular source of non-volatile memory for a wide range of electronic applications. Flash memory devices typically use a one-transistor memory cell that allows for high memory densities, high reliability, and low power consumption. Common uses for Flash memory include portable computers, personal digital assistants (PDAs), digital cameras, and cellular telephones. In these devices, program code, system data such as a basic input/output system (BIOS), and other firmware can typically be stored in Flash memory. The use of Flash memory to store upgradeable data has necessitated the development of mechanisms to protect the data from unintended erasure or reprogramming.

Originally, a Flash memory device was erased all at once. Newer memory devices are typically based on a block architecture in which the Flash memory is divided into blocks of memory. This allows the file systems to erase blocks of Flash memory instead of the entire device. For example, critical system code can be stored in a lockable block of memory while other blocks are allocated to other portions of code or data.

To ensure the integrity of block-based Flash memory, memory blocks should be protected against unintended write operations when data is written to the device or when code updates occur. One method of block protection for Flash memory includes the use of block locking configuration data that is stored in the Flash memory.

This approach, however, still exposes the memory blocks to inadvertent or malicious corruption of data. The block may be inadvertently unlocked and erased or overwritten. Additionally, a computer virus may be written to unlock the memory blocks and corrupt the data stored in those blocks. Any loss of data would typically result in a user expending time and money to replace the data. There is a resulting need in the art to permanently lock memory blocks in a Flash memory device.

SUMMARY

The embodiments of the present invention encompass a method for permanent memory block protection in a Flash memory device. The memory device has a plurality of memory blocks that are lockable in response to a lock command. Entering a secure command to the memory device initiates the secure function. In one embodiment, this secure command is the same as the lock command. Writing a control data word to a control address indicates which blocks of lockable memory to permanently secure against write and erase operations.

BRIEF DESCRIPTION OF THE DRAWINGS

FIG. 1 shows a diagram of bus cycle operations for an embodiment to program a secure block of memory.

FIG. 2 shows an embodiment for a data word to program a secure block of memory in accordance with the bus cycle operations of FIG. 1.

FIG. 3 shows a table of an embodiment for different configurations of memory block status.

DETAILED DESCRIPTION

Figure 4:
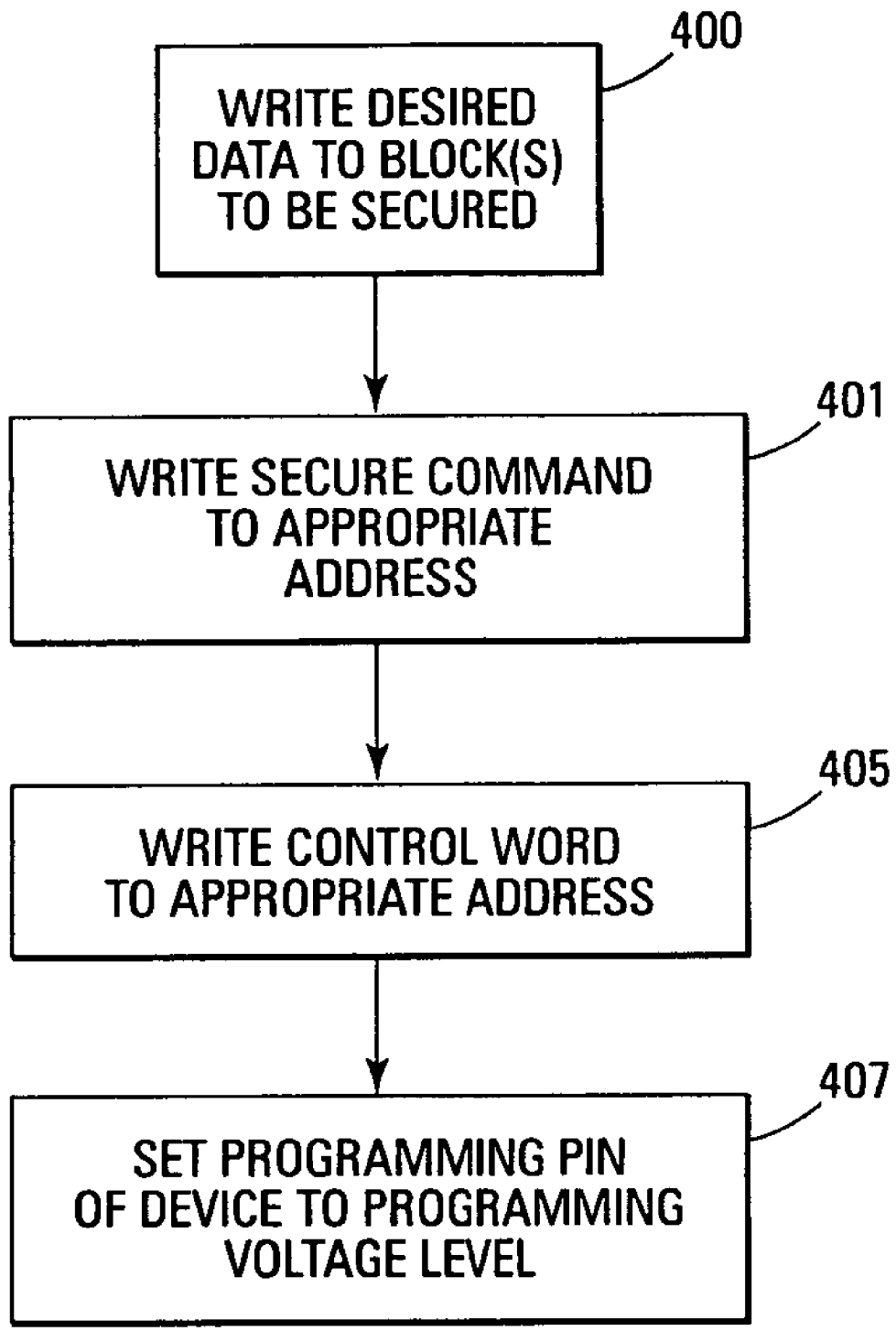
FIG. 4 shows a flowchart of an embodiment for a secure programming method of the present invention.

The embodiments of the present invention provide a permanent disablement of a write or erase operation to one or more memory blocks of a Flash memory device. By writing a command word and control data word to set a non-volatile latch, the memory block(s) cannot be erased or reprogrammed.

The embodiments of the present invention differentiate between a regular (temporary) lock function and the present invention's permanent secure function of the memory device. The temporary lock function control can be cleared and the memory blocks erased or reprogrammed. The permanent secure function of the present invention cannot be cleared once it is set. Additionally, as is discussed subsequently, the permanent secure function also forces the regular lock function to be set as "locked".

FIG. 1 illustrates one embodiment of a diagram of the operations performed during multiple bus cycles in order to implement the memory block disablement of the present invention. In this embodiment, first and second bus cycles (100 and 110) are used. Each bus cycle is comprised of an operation field (101 and 111), an address field (103 and 113), and a data field (105 and 115). Alternate embodiments use additional or different fields as well as different quantities of bus cycles to perform the operations.

In the embodiment of FIG. 1, the first bus cycle (100) sets the command (e.g., C0 hexadecimal) for the secure function. The second bus cycle (110) sets the particular memory blocks to be permanently disabled. Alternate embodiments use other quantities of bus cycles and other operations during the bus cycles to implement the secure function. The secure command used in the present invention, in one embodiment, is also used for another function within the memory device. However, in such an embodiment, the command is written to a different register that is assigned to that particular function.

Referring to FIG. 1, the first bus cycle (100) performs a write (101) operation of the secure command (105) C0 (hexadecimal) to the control circuitry of the memory device. For example, if addresses 80–85 hexadecimal are used as specific registers, address 8C hexadecimal may be used as the write address for the secure command (105). Alternate embodiments use other addresses. The specific address used by the secure command is not important.

The secure command, in one embodiment, is the same as the lock command that is used to perform a lock operation on memory blocks of the memory device. Alternate embodiments use other secure commands.

The second bus cycle (110) performs a write (111) operation of a control data word (115) that indicates the memory block or blocks that are to be secured. The control data word (115) is illustrated in FIG. 2 and discussed subsequently. The write operation of the second cycle (110) uses a control address of 008C hexadecimal (113). In one embodiment, the control data word is written to the same unused address to which the secure command is written. Alternate embodiments use other control addresses.

FIG. 2 illustrates one embodiment of the control data word used in the second bus cycle of the present invention to indicate which block or blocks of memory to permanently secure. As illustrated in FIG. 1, this control data word is written to control address 008C hexadecimal (201).

The control data word is comprised of eight control bits (203–213). In one embodiment, in order to secure the particular memory block represented by each control bit, a logic 0 is used in that particular control bit location.

As an example of operation, control bit DQ0 (213) secures memory block 0 that is located starting at memory address 000000H. Therefore, the control data word would be FE hexadecimal in order to secure memory block 0.

Additionally, memory block 1, starting at address 010000H, is represented by bit DQ1 (211). This block can be secured by a control data word of FD hexadecimal. Memory block 30, starting at address 1E0000H, is represented by bit DQ2 (209) and is secured by a control data word of FB hexadecimal. Memory block 31, starting at address 1F0000H, is represented by bit DQ3 (207) and is secured by a control data word of F7 hexadecimal.

All thirty-two memory blocks of the Flash memory device can be secured by a logic 0 in the DQ4 (205) position of the control data word. This would use a data word of EF hexadecimal written to address 008C hexadecimal. When DQ4=0, the status of the other control bits is irrelevant; all memory blocks are permanently secured. In this embodiment, control bits DQ5–7 (203) are not used. Alternate embodiments can use these additional bits to represent other memory blocks to secure.

The memory blocks and control data words discussed above are for illustration purposes only. Alternate embodiments represent other memory blocks by the bits of the control data word. For example, different combinations of bits in the control data word indicate different memory blocks. One embodiment secures a particular memory block by a logic 1 in the appropriate bit location instead of the logic 0 of the above-described embodiment.

The specific memory address used for the secure command write operation can be read like other protection register bytes. This may be accomplished using a "read query" command at the particular address to which the command was written. The read operation provides the status of the memory blocks by indicating which blocks are permanently secured.

The permanent secure function of the present invention is an added level of security in addition to the temporary block locking function of the prior art. The secure function overrides the temporary locking function. In other words, even if the temporary locking function is not set to "lock", instituting the secure function of the present invention will lock the appropriate memory blocks of the device. The "locked" status of the various memory blocks will be indicated when a "read query" command is implemented at the specific address in which the control word is written.

FIG. 3 illustrates one embodiment of a table showing the setting of the secure (303) and temporary locking (301) functions and the status (305) that will be indicated in response to the "read query" command. In one embodiment, each "No" is indicated by a logic 0 and each "Yes" is indicated by a logic 1. A "not locked" status is indicated by a logic 0 and a "locked" status is indicated by a logic 1. Alternate embodiments use the opposite logic.

The table shows that when the temporary locking function is not locked and the block is not secured, the block status is "not locked". If the temporary locking function is not locked and the block is secured, the block status is "locked". If the temporary locking function is locked and the block is not secured, the block status is "locked". Finally, if both the temporary locking function and the secure function are indicated as locked, the block status is "locked".

FIG. 4 illustrates a flowchart of one embodiment of a memory block securing method of the present invention. Prior to securing a memory block or blocks, data is written to the desired blocks to be secured (400). This data may include any data that is desired to save indefinitely that does not require updating. For example, default system configuration data or BIOS data.

The secure command is then input to the memory device (401). As in the embodiment illustrated above, this command is C0 hexadecimal entered as a command to the control circuitry of the memory device. The write operation of the secure command initiates the secure function.

The control data word that indicates which memory blocks to secure is then written to an address (405) that is not being used by other functions of the memory device. In one embodiment, this address is 008C hexadecimal. Alternate embodiments use other unused addresses. The specific address used for the present invention is not important as long as it is not used by the same function of the memory device.

In one embodiment, simultaneous with the two write cycles illustrated in FIG. 1, a predetermined enabling voltage is applied to an enabling pin of the memory device. The enabling voltage finalizes the secure function by permanently programming the control word into the memory device. This voltage is typically greater than 7.0V. Alternate embodiments use other voltages or other voltage ranges. It is desirable to use a voltage that is high enough above the normal 5V supply voltage so that the memory blocks cannot be inadvertently secured. The enabling voltage is not required for proper operation of the memory block securing method of the present invention.

In another embodiment, some of the memory blocks have already been temporarily locked with a lock command written to a lock command register as is well known in the art. If the secure command is written to the unused address along with the control data word, as described above, the lock function is overridden by the secure function and those memory blocks specified in the control data word are permanently secured against write and erase operations.

Figure 5:
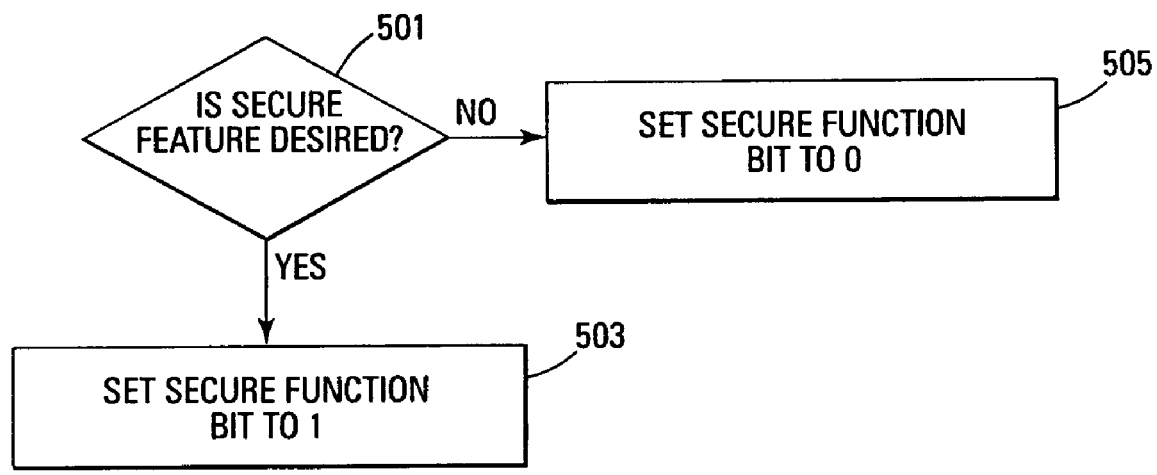
FIG. 5 shows a flowchart of an embodiment for a secure function enablement method of the present invention.

FIG. 5 illustrates a flowchart for one embodiment of a secure function enablement method of the present invention. This method provides a memory device manufacturer with the ability to design a single memory integrated circuit that has the secure function built-in. If a customer desires to use the function for a particular implementation, the customer or the manufacturer can enable it. If the secure function is not required, the feature does not need to be enabled. Such a design reduces the integrated circuit design costs for the manufacturer.

The method begins with deciding whether the secure function feature is required (501). If the feature is required, the secure function bit is set to a logical 1 (503). If the secure function is not desired, the secure function bit is set to a logical 0 (505). Alternate embodiments reverse the secure function bit logic.

The function bit may be part of a control register in the memory device. For example, writing a data word that has a "1" in a secure function bit position to the control register would enable the function. The present invention is not limited to any one bit position or control register/memory location to enable the secure function feature.

In one embodiment, the memory device manufacturer or other manufacturer sets the function bit. Disabling the function bit of the present invention is not typically available to a user of the memory device. Making this function bit available for general use would negate the benefits of the security that it provides.

Figure 6:
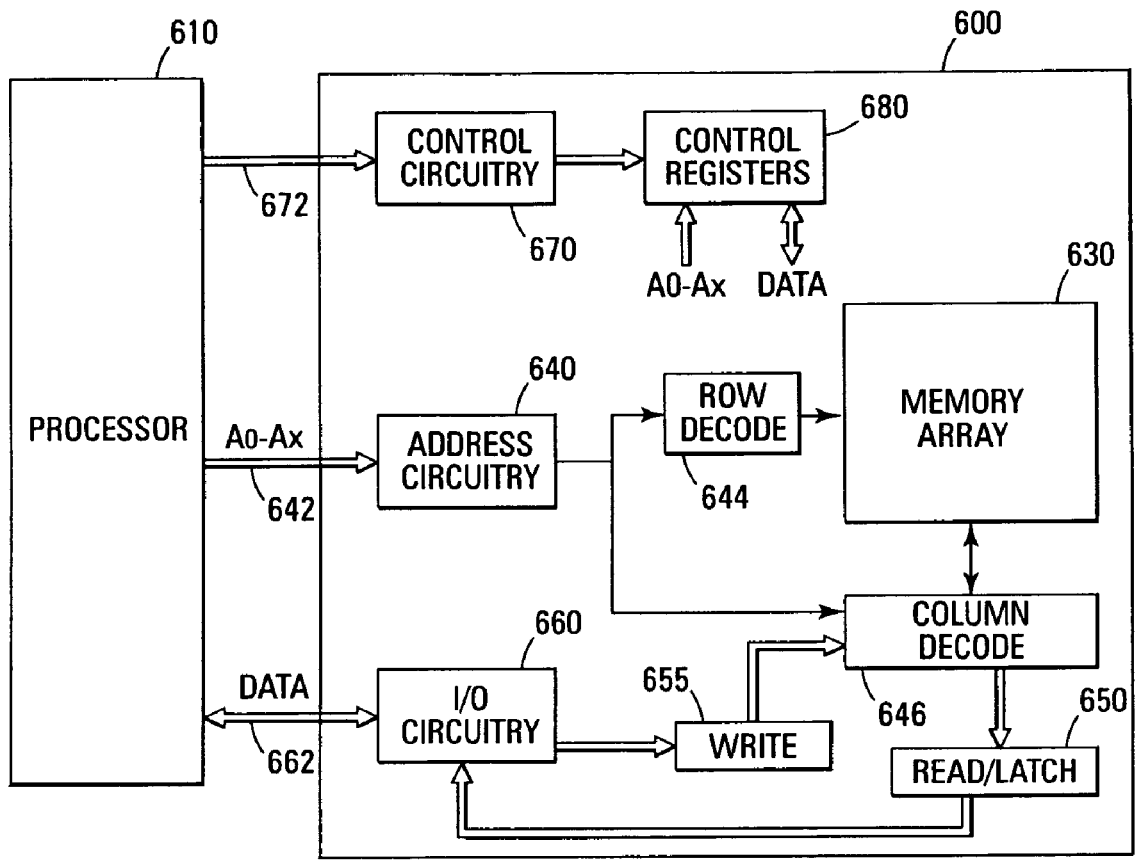
FIG. 6 shows a block diagram of a memory of an embodiment of the present invention.

FIG. 6 is a functional block diagram of a memory device (600) of one embodiment of the present invention that is coupled to a processor (610). The memory device (600) and the processor (610) may form part of an electronic system (620). The memory device (600) has been simplified to focus on features of the memory that are helpful in understanding the present invention. The memory device includes an array of memory cells (630). The memory cells are non-volatile floating-gate memory cells and the memory array (630) is arranged in banks of rows and columns.

An address buffer circuit (640) is provided to latch address signals provided on address input connections A0–Ax (642). Address signals are received and decoded by a row decoder (644) and a column decoder (646) to access the memory array (630). It will be appreciated by those skilled in the art, with the benefit of the present description, that the number of address input connections depends on the density and architecture of the memory array (630). That is, the number of addresses increases with both increased memory cell counts and increased bank and block counts.

The memory device (600) reads data in the memory array (630) by sensing voltage or current changes in the memory array columns using sense/latch circuitry (650). The sense/latch circuitry, in one embodiment, is coupled to read and latch a row of data from the memory array (630). Data input and output buffer circuitry (660) is included for bi-directional data communication over a plurality of data (DQ) connections (662) with the processor (610). Write circuitry (655) is provided to write data to the memory array.

Command control circuit (670) decodes signals provided on control connections (672) from the processor (610). These signals are used to control the operations on the memory array (630), including data read, data write, and erase operations.

An array of control registers (680) store the secure command and the control data word of the present invention. Some of the control registers are used for typical control functions and others are reserved for expansion and/or future use. In one embodiment, at least one address within the control registers (680) is comprised of memory cells that have no erase circuitry. Once these registers have been programmed with the appropriate secure command and control data word, the enabling voltage makes the programming permanent as discussed previously.

The flash memory device illustrated in FIG. 6 has been simplified to facilitate a basic understanding of the features of the memory. A more detailed understanding of internal circuitry and functions of flash memories are known to those skilled in the art.

In summary, the memory block secure function of the present invention provides a memory device user with the capability of permanently securing a block or multiple blocks of memory. With this feature, the secured memory blocks cannot be inadvertently erased or reprogrammed.

Numerous modifications and variations of the present invention are possible in light of the above teachings. It is therefore to be understood that within the scope of the appended claims, the invention may be practiced otherwise than as specifically described herein.

What is claimed is:

1. A method for permanent memory block write/erase disablement in a flash memory device having a plurality of memory blocks, the method comprising:
   writing a predetermined command to the memory device to initiate a write protection function; and
   permanently disabling write and erase operations to at least a first memory block of the plurality of memory blocks in response to writing a predetermined data word indicating at least the first memory block.

2. The method of claim 1 and further including setting a secure function bit in the predetermined data word to enable the predetermined command.

3. The method of claim 1 wherein the predetermined command includes a lock command that substantially simultaneously performs a lock operation on the memory device, in addition to permanent disablement of at least the first memory block, when written to one of a plurality of control registers used to control operation of the memory.

4. The method of claim 1 wherein the predetermined command is written during a first bus cycle and the predetermined data word is written during a second bus cycle.

5. The method of claim 1 wherein the predetermined data word is comprised of a plurality of bits for indicating different blocks of memory.

6. A method for permanent memory block write/erase operation disablement in a flash memory device having a temporary lock command, the method comprising:
   submitting a secure command to the memory device to initiate a permanent secure function, the secure command being equivalent to the temporary lock command while maintaining their functional difference;
   writing a control data word to the memory device; and
   enabling the secure command and control data word with an enable voltage.

7. The method of claim 6 wherein a predetermined quantity of bits of the control data word specify predetermined blocks of memory that are to be permanently disabled against write and erase operations.

8. The method of claim 7 wherein one bit of the predetermined quantity of bits specifies that all lockable blocks of memory be permanently disabled against write and erase operations.

9. A method for permanent memory block write and erase disablement in a flash memory device having a plurality of control addresses, a subset of the plurality of control addresses being non-volatile and unused for memory operations, the method comprising:
   writing a secure command to the memory device;
   writing a control data word to a first control address of the subset of control addresses to indicate which memory blocks of the flash memory device to permanently disable;
   permanently programming the control data word into the first control address; and
   performing a read query command at the first control address to determine a secure status of the memory blocks.

10. The method of claim 9 and further including applying an enabling voltage to an enabling pin of the memory device, the enabling voltage being greater than a supply voltage of the memory device.

11. A flash memory device comprising:
a plurality of memory blocks each comprising a plurality of non-volatile, floating gate memory cells;
control circuitry to which a command can be written to initiate a permanent memory block disablement function; and
a control address, unused for memory operations, to which a control data word is written to specify which of the plurality of memory blocks to permanently disable write and erase operations with the memory block disablement function.

12. The flash memory device of claim 11 and further including an enabling pin to which an enabling voltage is applied to program the command.

13. The flash memory device of claim 11 wherein the control address includes a non-volatile bit that permanently enables the memory block disablement function.

14. The flash memory device of claim 11 wherein the plurality of memory blocks comprises a set of temporarily lockable memory blocks that the memory block disablement function permanently locks with the command.

15. The flash memory device of claim 11 wherein the control data word comprises a plurality of bits that each indicate one of: a different block to permanently disable the write and erase functions or a set of memory blocks to permanently disable the write and erase functions.

16. A flash memory device comprising:
a plurality of lockable memory blocks that are adapted to be either temporarily lockable or permanently securable;
a non-volatile secure function latch that permanently enables a secure function; and
a memory address that is unused for memory operations to which a control data word is written to specify which of the plurality of lockable memory blocks to temporarily lock and which to permanently secure against write and erase operations in response to the secure function, the memory address being comprised of memory technology without erase circuitry.

17. The flash memory device of claim 16 and further including an enabling pin to which an enabling voltage is applied to program the control data word, the enabling voltage being greater than a memory device supply voltage.

18. The flash memory device of claim 16 wherein the non-volatile secure function latch is adapted to accept a logic one to enable the secure function.

19. An electronic system comprising:
a processor that controls operation of the system; and
a flash memory device, coupled to the processor, comprising:
a plurality of lockable memory blocks that are adapted to be either temporarily lockable or permanently securable;
a non-volatile secure function latch that permanently enables a secure function; and
a memory address that is unused for memory operations to which a control data word is written to specify which of the plurality of lockable memory blocks to temporarily lock and which to permanently secure against write and erase operations in response to the secure function, the memory address being comprised of memory technology without erase circuitry.

* * * * *